Patented June 12, 1928.

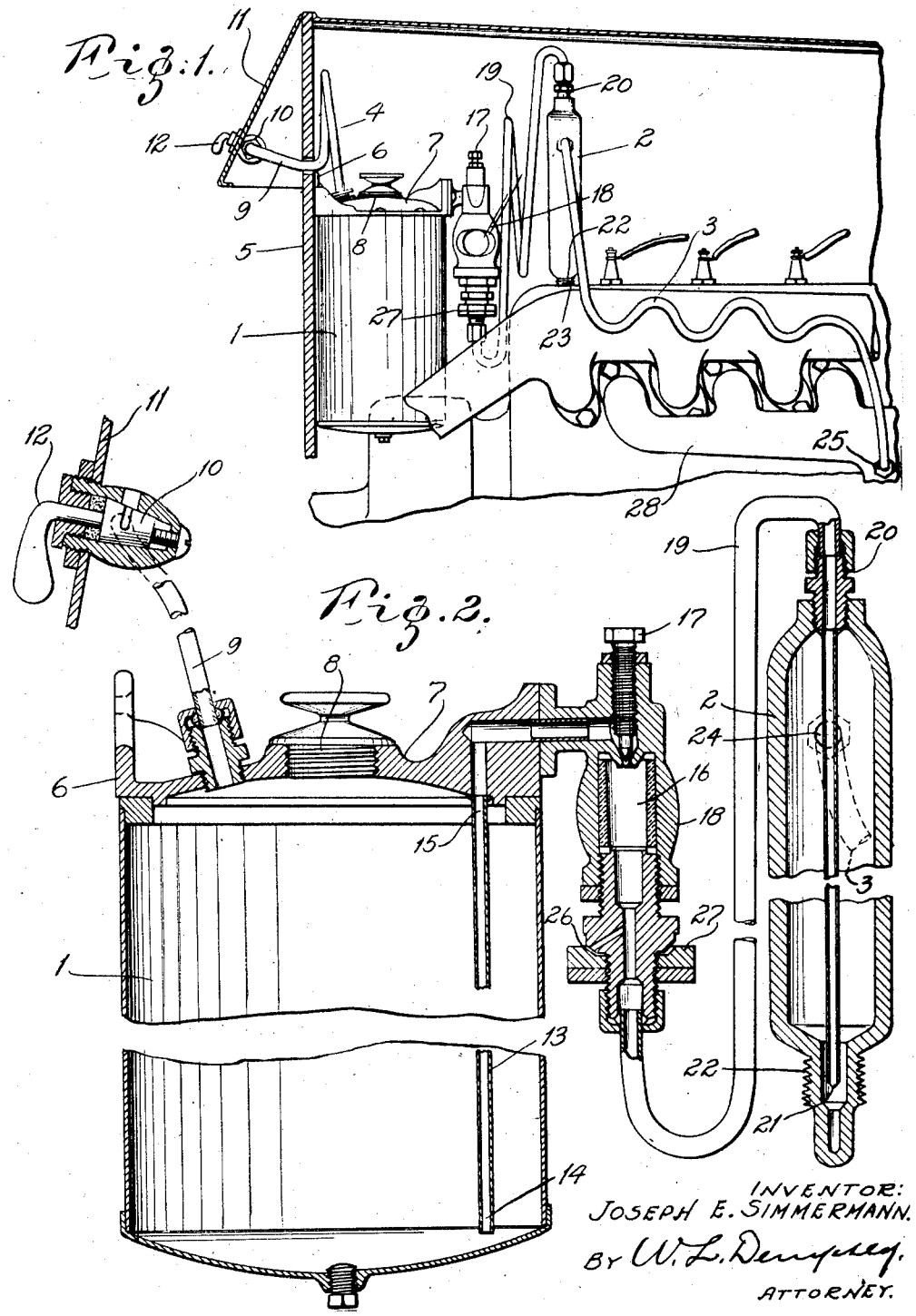

1,672,992

UNITED STATES PATENT OFFICE.

JOSEPH E. SIMMERMANN, OF ST. LOUIS, MISSOURI.

STEAM INJECTOR FOR COMBUSTION ENGINES.

Application filed January 21, 1927. Serial No. 162,578.

My invention relates to combustion engines, and specifically to devices for improving the efficiency thereof.

The object of my invention is to provide means for increasing the vaporization of the fuel, for increasing the density of the charge, for preventing detonation, and for increasing the general efficiency of the motor.

Other objects and advantages will be disclosed in the specification, claim and drawings, in which:—

Fig. 1 is a general view of the application of my device.

Fig. 2 is a longitudinal cross-section of the main portion of my device.

Many attempts have been made to apply heat to the intake manifold of a combustion engine for the purpose of breaking up large molecules into smaller molecules; or, in other words, to more completely vaporize the fuel as it enters the cylinders of a motor.

These attempts have generally been directed toward the application of the heat to the air before it reaches the carburetor, or to the air and fuel after it has passed the carburetor, and in some cases the heat has been applied directly to the fuel and not to the air.

The principal objection to each of these methods is that the volumetric efficiency of the motor is reduced because of the expansion of the air when heated, and this is equally true with all methods now in use; and while these methods are valuable in that they increase the economy of the motor, they are objectionable because they reduce the over-all efficiency of the motor, as well as reduce the compression pressure because the density of the heated air is less than that of unheated air.

It is well understood that heat is the only agent capable of breaking up or "cracking" large molecules into smaller molecules; and it is, also, well understood that heat is absorbed in proportion to the surface with which it contacts. Therefore, I have provided means for injecting superheated steam into the intake manifold between the carburetor and the cylinders, which has the effect of not only increasing the density of the charge, but brings the finely comminuted particles into the most intimate contact with like particles of fuel and air, so that the fuel readily absorbs the heat from the steam.

At the same time, the result of the injected steam is a high state of turbulence, whereby the fuel and air are more completely and thoroughly mixed, and at the same time the fuel is more thoroughly vaporized, or broken up into smaller molecules, and the volumetric efficiency of the engine is, also, increased.

Another object of my invention, as above set forth, is to prevent detonation. Without expressing an opinion as to the cause of detonation, it has long been known that the injection of water or steam with the fuel reduces or prevents detonation.

Since the compression of a throttle-governed combustion engine varies with the opening and closing of the throttle, I have found it necessary to provide a control that will regulate the amount of steam injected under various conditions of load and speed. Therefore, I have provided means for admitting air with the steam, which said air is under suitable control, as later described.

With these objects in view, I have devised the means schematically shown in Fig. 1, consisting of a tank or water container 1, a vacuum boiler 2, a superheater 3, a pressure control 4. While my preferred method is as herein set forth, I wish it understood that various changes in position, size and form may be used without departing from the general and specific uses and functioning of my invention; e. g. the relative position of the tank 1 and the vacuum boiler 2 will vary in different makes of cars. The tank may be located at a relatively higher altitude than the vacuum boiler without affecting the efficiency of my device.

In operation the tank 1 is attached to the dash 5 by means of the bracket 6, which may or may not be integral with the cover 7. An opening for filling the tank is provided by the screw-threaded member 8, which may be made air-tight by a washer not shown.

When the tank is filled approximately full of water, it is evident that since the tank is air-tight, no water could be pumped therefrom without the admission of air. Therefore, I have provided a pressure control designated as 4, which consists of a conduit 9 in open communication with the tank 1, at one end, and in controlled communication at its opposite end by means of a suitable air valve designated as a whole as 10, which may consist of any desired form of valve that may be manually opened and closed.

In my preferred method the valve 10 is suitably attached to the instrument board 11 and may be opened and closed by turning the valve stem 12.

Wholly within the body of the tank 1, a conduit 13 is provided, having its lower end 14 opening and positioned near the bottom of the tank 1, its upper end 15 being in controlled communication with a sight feed 16 regulated and controlled by the needle valve 17, the sight feed 16 consisting of a closed glass tube hermetically sealed within the body portion 18, and in open communication with the vacuum boiler designated as a whole as 2 by means of the connecting tube 19, which enters the vacuum boiler at its top end by suitable connections 20, and extends through the geometrical center of the boiler to a point adjacent the bottom thereof with which it is in open communication as shown at 21.

The vacuum boiler 2 is reduced and screw-threaded at its lower portion 22, adapted to be screwed into a threaded opening through the walls of the exhaust manifold shown at 23.

The heat from the exhaust contacting with the lower portion of the vacuum boiler 2, causes the water to generate steam, which is discharged from the boiler through the opening 24 near its upper end, which said opening is in open communication with the superheater 3, which may be of any form best suited to absorb heat from the exhaust manifold against which it is securely attached.

The lower end 25 of the superheater 3 is in open communication with the intake manifold at a point equally distant between the end cylinders of a multiple-cylinder engine, and at a point as near the cylinders as possible, and hence as far removed from the carburetor as possible or convenient.

In order to regulate the amount of water flowing from the tank 1 to the vacuum boiler 2, an air vent 26 is provided which may be controlled by a lock-nut 27, or other suitable means.

It is obvious that when the motor is started, the low pressure in the intake manifold is communicated to the vacuum boiler 2, by means of the superheater 3, which in turn creates low pressure in the tubes 19 and 13, thus creating a vacuum in the tank 1, causing the water to flow from the tank 1 to be discharged into the vacuum boiler 2 at the bottom thereof where it is heated and steam generated, which flows through the opening 24 through the superheater 3 into the intake manifold 28.

It is, also, equally obvious that a pulsating movement would be given to the steam in proportion to the difference in the pressure of the steam and the vacuum created in the cylinder, and if the air valve 10 is open and the needle valve 17 is open, and the vent 26 closed, all the water in tank 1 would soon be withdrawn; therefore, in order to secure a proper pressure relation between the suction of the motor, the generation of steam and the supply of water to the vacuum boiler, it is necessary that somewhat sensitive and delicate control be provided. Therefore, by means of adjusting the needle valve with relation to the vent 26 and the air valve 10, aided by the sight feed 16, the proper balance can be maintained so that the proper amount of steam may be generated to best suit the running conditions and thereby supply sufficient heat to more completely vaporize the fuel, sufficient steam to increase the density of the charge thereby increasing the compression pressure, and a sufficient amount of moisture to prevent detonation.

Having fully described my invention, what I claim as new and useful is:—

A steam injector for combustion engines of the character described, comprising a water container adapted to be attached to the dash board of an automotive vehicle and in communication with the intake manifold of a combustion engine by means of a sight feed, a vacuum boiler and a superheater, said sight feed being vertically disposed adjacent said water container and connected in open communication therewith, an air vent leading from the interior of said sight feed to the open air, adapted to be opened and closed by a lock-nut thereby regulating the amount of air entering said sight feed, said sight feed being in open communication at its lower end with the lower end of said vacuum boiler by means of a tube entering the top of said vacuum boiler and extending therethrough to a point adjacent its lower end, said vacuum boiler having its lower end reduced and screw-threaded adapted to be screwed into a screw-threaded opening through the walls of the exhaust manifold of a combustion engine, and being in open communication at a point intermediate its ends with the intake manifold of a combustion engine by means of a multiple folded tube adapted to be rigidly held against the external wall of an exhaust manifold, thereby absorbing heat from said exhaust manifold sufficient to superheat steam being discharged from said vacuum boiler through said multiple folded tube.

In witness whereof I have hereunto affixed my signature this 31st day of December, 1926.

JOSEPH E. SIMMERMANN.